United States Patent Office 3,114,092
Patented Dec. 10, 1963

3,114,092
ELECTRONIC DRIVING MEANS FOR TIMEPIECES
Aurèle Maire, Bienne, Switzerland, assignor to Fabrique des Montres Zenith SA, Le Locle, Switzerland
Filed Oct. 12, 1959, Ser. No. 845,767
Claims priority, application Switzerland Apr. 10, 1959
1 Claim. (Cl. 318—132)

This invention relates to electronic timepieces and balances therefor.

The electronic maintenance of the balance oscillations of a timepiece has previously been realized by equipping a balance with a permanent magnet inducing to an amplifier control coil, a current watch, amplified by this latter, goes through a second coil, thus generating a force which is in its turn transmitted to the balance.

By making use of permanent magnets located in the balance circle plane, it is necessary to provide for two identical magnets, diametrally opposed and inverted, for the purpose of protecting the system against the influence of an outside uniform magnetic field such as, as for instance, the earth's magnetic field.

However, by arranging a single magnet with its mass balanced by a counterweight of non-magnetic material, in parallel to the balance staff, the aforesaid influence will be cancelled.

The timepiece according to the invention comprises a balance of the type already mentioned with a sole magnet and provides for two coaxial air-core coils, one of which is arranged over and the other beneath the balance, so that upon the passage of the magnet between these coils, the magnetic axis and that common to the coils are merged, one of the coils controlling the amplifier and the other being excited by the amplified current.

The accompanying drawing shows an embodiment of the invention, given by way of example.

Figure 1:
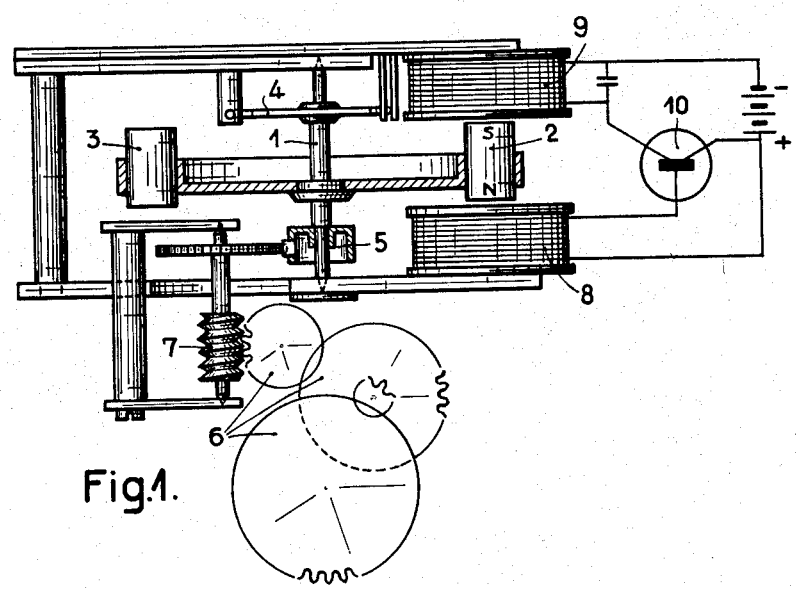
FIG. 1 is a comprehensive semi-schematic view of said embodiment.

According to FIG. 1, the balance is supported on shaft 1 and bears, on the one hand, a small permanent magnet 2, and on the other hand, a counterbalancing mass 3 of non-magnetic material. The axis N—S of the magnet 2 is parallel to the balance staff.

Element 4 is the hairspring and element 5 is the pallet oscillation recorder operating on the runners 6 through the worm 7, runners which, in their turn, drive the time indicating members not shown.

Two air-core coils 8 and 9 are arranged respectively beneath the balance circle plane and over the said plane. These two coils are coaxial and placed in such a way, that upon the passage of the magnet 2 between them (position of FIG. 1) the axis of this latter is momentarily coincident with the axis common to the two coils.

On the right of FIG. 1 is the diagram of the amplifier fed by the coil 8, the amplifier being mainly made up of a transistor 10.

Figure 2:
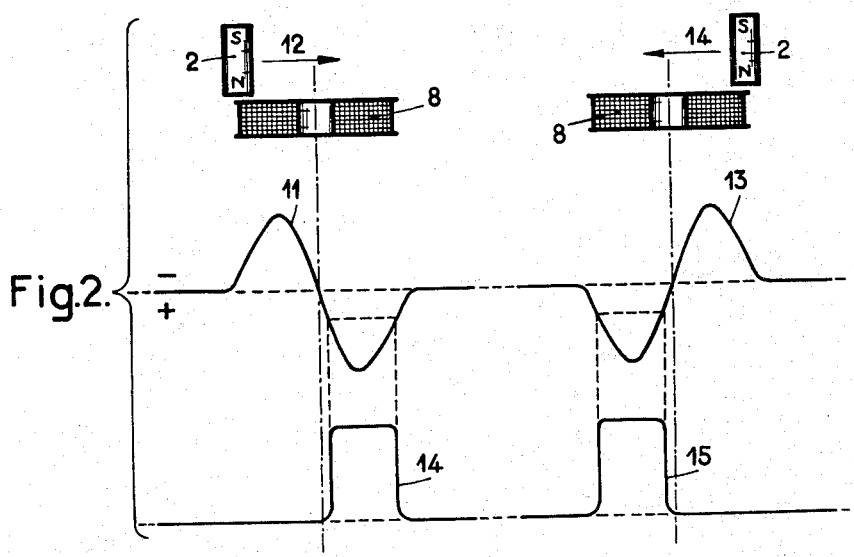
FIG. 2 is a diagram showing the inducing coil, the voltages which are therein induced and now the excitation voltages transmitted to the other coil behave.

The diagram of the FIG. 2 illustrates what happens when the permanent magnet 2 is displaced perpendicularly to its axis between the coils 8 and 9.

The upper curve 11 represents the voltages induced in the control coil 8, as the magnet passes in front of this latter in the direction of the arrow 12 and the upper curve 13, the same voltages upon a passage in reverse direction, as per arrow 14.

The distance between the curves 11 and 13 will correspond to half an oscillation of the considered balance.

By allowing the control impulses resulting from these induced voltages to act on the amplifier, it is possible to obtain the correponding power impulses, represented by the lower curves 14 (corresponding to 11) and 15 (corresponding to 13).

These amplified and in the present case rectified impulses will maintain in their turn the oscillations of the balance by operating upon its sole magnet 2 through the power coil 9, the principle of such a maintenance of oscillations being in itself known.

The present arrangement presents however the advantage, due to the quite symmetrical disposition of the two coilings, of allowing to obtain two motive impulses absolutely identical, whatever may be the balance oscillation direction.

In addition to that, the considered magnet circuit comprising no armature, the balance motion is absolutely free, the magnet being attracted only by the magneto-motive force destined for the maintenance of the oscillations.

Finally, assuming that it is possible to bring the transistor into a saturation state already for weak control impulses, it is obvious that the balance will receive on each of its passages at the dead-point a constant power quantity. The envisaged arrangement fulfils then the most favorable conditions of a constant force escapement.

However, since the working of a transistor in saturation state is practically possible only by avoiding submitting it to sensible variations of temperature, the above conditions will be only fulfilled if one takes care to apply to the transistor an auxiliary voltage function of the surrounding temperature proper to maintain therein the saturation state, notwithstanding the variations of this latter. This can be realized, for instance, by means of an auxiliary current source and a set of resistances, some of which vary in accordance with the temperature.

What I claim is:

An electronic timepiece comprising a balance having an axis and including a single permanent magnet and a counterweight of non-magnetic material, said magnet having a N—S axis parallel to the balance axis, two air-core coaxial coils fixed in spaced relationship on opposite sides of said balance such that, upon passage of said magnet between the coils, the axes of the coils and magnet come into coincidence, and an amplifier coupled to and controlled by one of the coils and coupled to and controlling the other of the coils.

References Cited in the file of this patent

UNITED STATES PATENTS

| 2,907,940 | Beyner | Oct. 6, 1959 |
| 2,957,116 | Hurd | Oct. 18, 1960 |
| 2,986,683 | Lavet | May 30, 1961 |

FOREIGN PATENTS

| 1,092,411 | France | Nov. 10, 1954 |
| 1,199,044 | France | June 15, 1959 |